United States Patent [19]

Dunfield

[11] Patent Number: 5,633,568
[45] Date of Patent: May 27, 1997

[54] METHOD AND APPARATUS FOR DYNAMIC LOW VOLTAGE SPINDLE MOTOR OPERATION

[75] Inventor: John Dunfield, Santa Cruz, Calif.

[73] Assignee: Seagate Technology, Inc., Scotts Valley, Calif.

[21] Appl. No.: 481,817

[22] Filed: Jun. 6, 1995

Related U.S. Application Data

[63] Continuation of Ser. No. 204,840, Mar. 1, 1994, and a continuation of Ser. No. 205,185, Mar. 1, 1994, abandoned.

[51] Int. Cl.$^6$ .................................................. G11B 21/08
[52] U.S. Cl. ........................ 318/254; 318/560; 318/634; 360/78.01; 360/69
[58] Field of Search ................ 318/34–90, 138, 318/254, 245, 439, 280–296, 700–832; 360/75, 105, 69, 70, 71, 74.1; 324/107; 361/77, 76, 54

[56] References Cited

U.S. PATENT DOCUMENTS

| | | | |
|---|---|---|---|
| 4,565,957 | 1/1986 | Gary et al. | 318/723 |
| 4,641,090 | 2/1987 | Danby | 324/107 |
| 4,724,503 | 2/1988 | Libert | 361/77 |
| 4,866,554 | 9/1989 | Stupeck et al. | 360/105 |
| 4,939,600 | 7/1990 | Desai et al. | 360/78.04 |
| 5,045,811 | 9/1991 | Lewis | 331/1 A |
| 5,402,200 | 3/1995 | Shrinkle et al. | 360/69 |
| 5,442,266 | 8/1995 | Morehouse et al. | 318/272 |
| 5,491,391 | 2/1996 | Bahr et al. | 318/39 |
| 5,506,487 | 4/1996 | Young et al. | 318/811 |
| 5,521,768 | 5/1996 | Shrinkle et al. | 360/69 |

OTHER PUBLICATIONS

*Principles of Power Electronics*; John G. Kassakian, Martin F. Schlecht, George C. Verghese; 1991; pp. 190–191.

*Primary Examiner*—Paul Ip
*Attorney, Agent, or Firm*—Flehr Hohbach Test Albritton & Herbert LLP

[57] ABSTRACT

A spindle motor operates dynamically in one of two modes for a disc drive. During power-up, the disc drive electronics are configured to operate the motor in a line-to-line configuration, thus assuring generation of adequate torque. An operating condition circuit senses when the motor has attained substantially the desired running velocity ω, after which, the drive electronics are dynamically reconfigured to operate the spindle motor in a line-to-neutral mode. A power interruption circuit senses when the source power supply $V_{cc}$ voltage level is too low or turned off, thereafter initiating a reconfiguration back to line-to-line mode, wherein the highest voltage pair of motor windings are electrically held across the source power supply $V_{cc}$ lines. Simultaneously, a switching circuit electrically connects the $V_{cc}$ lines across the transducer positioning voice coil motor in the disc drive, thereby delivering current from the spindle motor to the voice coil. Because only one spindle motor winding is powered during normal operation, a back EMF voltage may be developed in a single winding to a level to just below the source power supply $V_{cc}$ level while still able to maintain motor operation. The reconfiguration to line-to-line mode allows for the series connection of two windings, necessarily contributing the back EMF energy from a pair of windings to the voice coil providing sufficient energy to cause the voice coil motor to park the transducer in a designated disc landing zone or on a ramp.

11 Claims, 11 Drawing Sheets

METHOD AND APPARATUS FOR DYNAMIC LOW VOLTAGE SPINDLE MOTOR OPERATION

RELATED APPLICATIONS

This application is a Continuation of (A) application Ser. No. 08/204,840 filed Mar. 1, 1994 and (B) application Ser. No. 08/205,185 filed Mar. 1, 1994, now abandoned.

FIELD OF THE INVENTION

The invention relates to operating low voltage brushless DC motors in general, and more specifically to operation of a low voltage brushless DC spindle motor in a magnetic disc drive storage unit.

BACKGROUND OF THE INVENTION

The preferred embodiment of the present invention operates a low voltage brushless DC spindle motor in a magnetic disc drive storage unit. For that reason, the background of this invention will be described with respect to operation of such motors. However, the present invention may be used to control brushless DC motors in non-computer applications as well.

Figure 1:
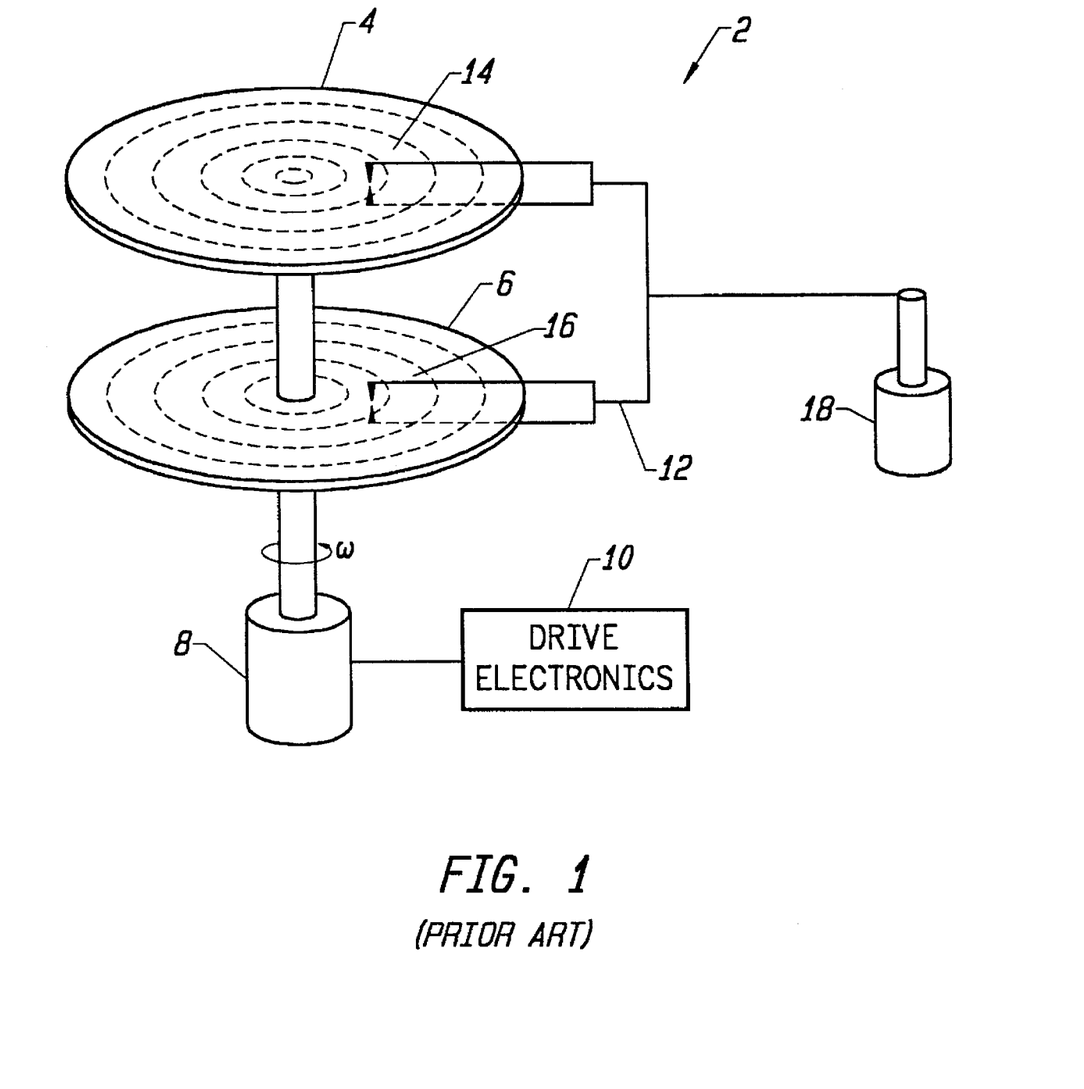
FIG. 1 depicts a generalized computer hard disc system, according to the prior art.

As shown by FIG. 1, a typical magnetic disc storage system 2 includes one or more magnetic storage discs or platters 4, 6 that are rotated with run velocity ω by a spindle motor 8 electrically coupled to drive electronics 10. Discs 4, 6 each have upper and lower surfaces upon which data may be magnetically written or read. More specifically, projecting arms of an actuator carriage 12 carry read/write heads (hereafter "heads") 14, 16 that respectively read and/or write data from the surfaces of discs 4 and 6. Generally, a voice coil mechanism 18 causes actuator carriage 12 to move all heads radially under command of a positioning servo controller mechanism (not shown).

When the spindle motor is not running, disc drive units park the head-ends of the actuator carriage. Some disc drive units include stationary parking ramps (not shown), upon which the head-ends of the actuator carriage 12 rest when the spindle motor 8 is not running. It may in fact be advantageous to couple the so-called back electromagnetic force ("EMF") generated by the spindle motor 8 during power-down (e.g., when motor 8 is turning off) to the voice coil mechanism to assist positioning carriage 12 onto the ramps. Alternatively, many disc drive units provide a latching mechanism (not shown) that engages the head-end of the actuator carriage when the spindle motor is not operating. So-called inertia latches (not shown) may also be provided to engage the head-end of the actuator carriage in the event of mechanical shock. It will be appreciated that parking the heads away from the disc surfaces can help protect the disc media from damage from physical contact with the heads. In any event, at spindle motor power-up, the heads must be unparked.

Modern disc drive units must also be able to handle substantial mechanical shock, often several hundred "g" units, or higher. To enhance mechanical shock handling capacity, the actuator assembly 12 is mechanically preloaded, essentially to stiffen the assembly. In disc drive units without stationary parking ramps, more stiffening is generally required to protect the magnetic media on the disc platter surfaces against physical contact with the heads.

Brushless DC low voltage motors such as spindle motor 8 are well known in the art. Such motors have a number of windings (or "phases"), that are sequentially coupled to a direct current ("DC") power source. As current flows through selected windings, torque-inducing magnetic flux orientations are produced in a synchronized fashion. The resultant torque causes a desired rotational movement of the motor rotor and attached discs 4, 6.

Figure 2:
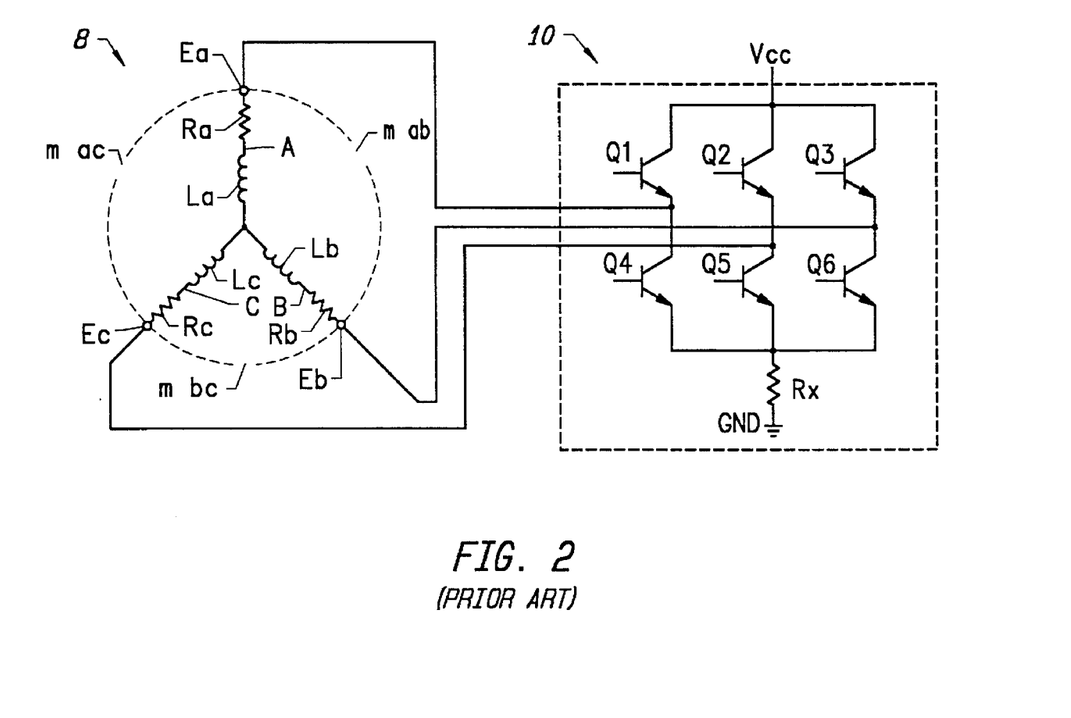
FIG. 2 depicts line-to-line operation of a three-phase brushless DC spindle motor, according to the prior art.

FIG. 2 shows the internal motor windings A, B and C for a typical three-phase brushless DC spindle motor 8. Each winding has an inductance Lx effectively in series with an associated resistance Rx and an effective back EMF generator Ex, where x=a, b or c. Further, effective mutual inductances, shown as m ab, m bc, m ac, are also present between the windings. Collectively, for each winding A, B or C, the associated inductance, series resistance, and mutual inductance may be defined by an effective impedance Zx in series with an associated back EMF generator Ex.

Drive electronics 10 typically provides two output drive transistors per each winding, six transistors Q1–Q6 in total. The drive transistors need not be bipolar (as shown), and could in fact be field effect devices, or any other switching device. Low level drive circuitry (not shown) within electronics 10 generates sequential base drive signals that are coupled to the base leads of drive transistors Q1–Q6. These base drive signals sequentially pulse selected drive transistors to produce the desired motor rotation.

In the prior art, motor 8 is operated by simultaneously energizing two series-coupled phases, a so-called "line-to-line" or "bipolar" mode of operation. In this sense, "bipolar" means that current through a winding may be caused to flow in either direction, as contrasted to a "unipolar" configuration wherein winding current can only flow in one direction. To achieve line-to-line mode, output drive transistors Q1–Q6 are sequentially switched to maintain two motor windings coupled in series between the power supply Vcc and ground. For example, by simultaneously providing positive base signals to Q1 and Q6, these two drive transistors turn on, energizing windings A and B, all other drive transistors being off. After flux produced by energized windings A and B causes the rotor of motor 8 to rotate 60° (electrical degrees), the low level drive circuitry turns off Q1 and turns on Q2, whereupon windings B and C are energized. After 60° further electrical rotation, Q6 is turned off and Q1 turned on to energize windings C and A, and so forth.

Line-to-line operation has the advantage of generating a large torque when the spindle motor is turned on ("power-up"). A large initial torque is required to overcome frictional and other forces to ensure start-up rotation of the spindle motor rotor and attached discs 4 and 6.

The following two equations must be taken into account when operating a spindle motor:

$$T_x = Kt_x \cdot I_x \quad (1)$$

$$I_x = (Vcc - EMF_x)/Z_x \quad (2)$$

where for each winding number x, $T_x$=net torque, e.g., torque less detent torque $T_D$ (ounce-inch), $Kt_x$=spindle motor torque constant (ounce-inch/ampere), $I_x$=winding current (amperes), Vcc=power supply voltage (volts), $EMF_x$= back EMF (volts), and $Z_x$=equivalent winding impedance (ohms).

Detent torque $T_D$ is the torque that exists in the spindle motor when none of the windings are energized. This torque results from magnetically-related motor torque due to mechanical misalignment and the like, as well as from coulomb friction torque, and magnetic loss torque.

In applying equations (1) and (2), it is understood that the torque, Kt, and back EMF contribution of each energized series-coupled winding a vector component to the resultant produced torque, Kt, and back EMF. For example, in a three-phase motor, the vector resultant produced by two-series coupled windings, each having a unit torque constant Kt, will be Kt·√3 or 1.73·Kt, assuming sinusoidal back EMF waveforms.

When the spindle motor is off, back EMF is of course zero. However, at power-up, back EMF increases with increasing rotor rotational velocity $\omega$. Thus, at power-up, little back EMF exists to retard current I. As a result, for a given Vcc (e.g., 5 VDC, or 3.3 VDC or even 3.0 VDC), a large start-up current I can be provided. From equation (1), it is apparent that by series-coupling two (or even more) windings that each have a reasonably large Kt, the resultant vectorially-combined Kt will be larger that the Kt for a single winding. As noted, the vector sum produced by series-coupling two windings in a three-phase (e.g., 120° offset) motor is 1.73·Kt. Thus, the resultant combination Kt×I product will be large, and the generated start-up torque T can be sufficiently large to ensure that the spindle motor will indeed rotate at power-up.

As noted, a large Kt is advantageous for spindle motor power-up. But, unfortunately, too large a Kt can become a liability once the desired rotational run velocity $\omega$ is attained because of the excessively large back EMF produced by the combined windings. As run velocity $\omega$ is approached and then attained, each series-coupled winding contributes an increasingly substantial back EMF component.

Since the available run current is directly proportional to (Vcc−back EMF), too a large back EMF (resulting from too large a Kt) can substantially reduce the magnitude of the available run current. Stated differently, as back EMF increases with rotational velocity, drive electronics 10 may no longer be able to cause sufficient current flow through the energized windings to sustain spindle motor rotation. Ideally, Kt should be sufficiently large to maintain a reasonable run current.

For a given Kt motor, Vcc may have to be increased to ensure a sufficient magnitude of run current through the series-coupled windings. However, increasing Vcc may not be a viable option as disc drive system power consumption will be increased substantially. Further, it may not be possible to increase Vcc. Many modern hard disc drive systems are expected to operate reliably and efficiently from a fixed low voltage battery-operated power supply, wherein Vcc may be as small as 3.0 VDC. Clearly, ensuring efficient normal run speed operation of a high Kt spindle motor from a low voltage power source may not always be feasible.

A method of operating a spindle motor at a lower voltage Vcc was disclosed in concurrently filed U.S. patent application Ser. No. 08/205,185 filed Mar. 1, 1994 and entitled "Method and Apparatus for Dynamic Low Voltage Spindle Motor Operation" to Dunfield which is herein incorporated by reference. This application disclosed a method of controlling the spindle motor, specifically a method and apparatus for reconfiguring the spindle motor operation from line-to-line operation to line-to-neutral operation after start-up. In this way, the supply voltage could be maintained at a lower level having only to overcome only a single winding contribution of back EMF.

Often the so called back electromotive force ("EMF") generated by the spindle motor 8 is coupled during power down to the voice coil mechanism to assist in the positioning of the actuator carriage 12. U.S. Pat. No. 4,742,410 to Smith disclosed a method and apparatus for using the spindle motor of a magnetic disc drive system as a generator for supplying the power to a stepper motor to position the actuator carriage away from the magnetic disc surfaces. Similarly, U.S. Pat. No. 4,866,554 to Stupeck et al. disclosed an apparatus for automatically retracting a head of a disc drive upon power interruption which included using the back EMF of the spindle motor coupled with a charged capacitor to supply the power to the voice coil motor to park the head assembly.

Many disc drive units include stationary ramps (not shown) or other parking regions upon which the read/write head ends of the actuator carriage 12 rest when the spindle motor 8 is not running. However, in order to provide the power to drive the head ends up a ramp or radially across the disc, a sufficient amount of torque must be able to be generated, requiring a large current to be delivered from the spindle motor. Heretofore, the higher current necessarily required the development of a higher back EMF or the use of other external power components. As was described above, the development of a higher back EMF would ordinarily require a larger power source voltage $V_{cc}$, which is generally undesirable.

What is needed is a mechanism whereby existing spindle motors can be operated to provide a high torque at power-up, not generate an unmanageable back EMF under normal running velocity conditions so as to allow for lower source voltages $V_{cc}$, and yet develop sufficient back EMF at power-down to provide high current to a voice coil to drive the heads of an actuator carriage for parking.

SUMMARY OF THE INVENTION

The present invention operates a spindle motor dynamically in one of two modes. During power-up, the disc drive electronics are first configured to operate the motor in a line-to-line configuration, thus assuring generation of adequate torque. An operating condition circuit senses when the motor has attained substantially the desired running velocity w. When this condition is sensed, the drive electronics are dynamically configured to operate the spindle motor in a line-to-neutral mode, wherein only a single motor winding is powered across the source supply $V_{cc}$. A power interruption circuit senses when the source supply $V_{cc}$ voltage level is too low or turned off. When this condition is sensed, the drive is reconfigured to operate the spindle motor back to a line-to-line mode, wherein the highest power pair of motor windings are electrically held across the source power supply $V_{cc}$ lines. Simultaneously, a switching circuit electrically connects the source power supply $V_{cc}$ lines across the voice coil motor, thereby delivering the kinetic energy stored in the spindle motor to the voice coil.

Because only one spindle motor winding is powered during normal operation, a back EMF voltage may be developed in a single winding to a level to just below the source power supply $V_{cc}$ level while still able to maintain motor operation. Upon power-down, the switch over to a line-to-line configuration allows for the series connection of two windings, necessarily contributing the back EMF energy from a pair of windings to the voice coil. The present invention provides for a three phase fully rectified signal to power the voice coil motor wherein the highest voltage pair of windings acts as the source for delivering current to the voice coil motor. Accordingly, the voltage available to drive the actuator carriage is square root of three times higher than the single high level back EMF (assuming a sinusoidal back EMF). As described, the present invention yields the result, that a back EMF power source for use by the voice coil with a resultant voltage level even higher than the source power supply $V_{cc}$ level.

BRIEF DESCRIPTION OF THE DRAWINGS

Additional objects and features of the invention will be more readily apparent from the following description in which the preferred embodiments have been set forth in detail in conjunction of the accompanying drawings, in which.

DETAILED DESCRIPTION OF THE PREFERRED EMBODIMENTS

Figure 3:
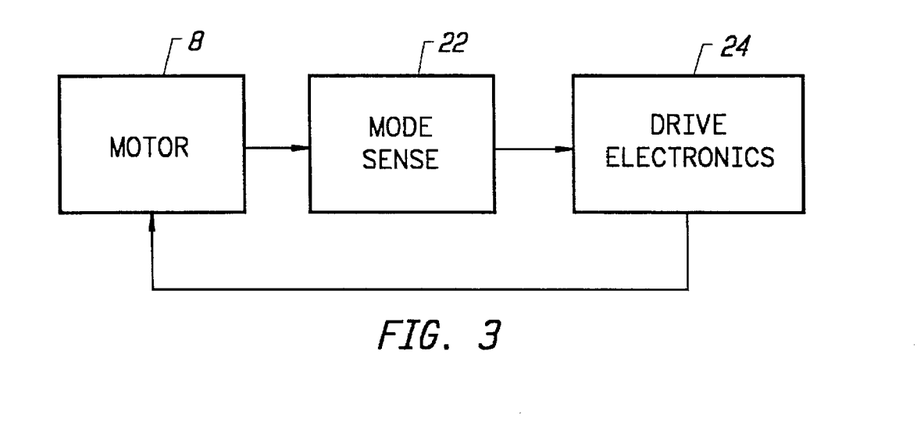
FIG. 3 is a block diagram of the present invention.

FIG. 3 is a generalized block diagram of the present invention, wherein motor 8 is an N-phase brushless DC motor that has N phases or windings, each of which has first and second ends. Drive electronics 24 is coupled to the various windings in motor 8. Electronics 24 selectively applies operating voltage Vcc from an external power source (not shown) to energize various of the windings. Typically drive electronics 24 is implemented on an integrated circuit chip that is mounted external to the spindle motor housing.

A mode sense circuit 22 is coupled between the motor and the drive electronics. Circuit 22 determines whether the present rotational velocity $\omega$ of motor 8 is less than or at least equal to a predetermined nominal running velocity $\omega_r$. When $\omega<\omega_r$, mode sense circuit 22 outputs a signal causing drive electronics 24 to operate motor 8 in a line-to-line or bi-polar configuration. However, if $\omega\geq\omega_r$, the output signal from circuit 22 causes drive electronics to operate motor 8 in a line-to-neutral or unipolar configuration.

As noted earlier, this dynamic bi-modal operation permits motor 8 to generate a high starting torque when required (e.g., $\omega<\omega_r$), but to operate generating less effective back EMF during normal run mode (e.g., $\omega\geq\omega_r$).

For an N-phase motor, line-to-line mode operation can be achieved by having drive electronics 24 selectively energize two (or more) of the phases. This mode advantageously generates a high starting torque. But in line-to-neutral mode operation, drive electronics 24 causes only one phase to be energized at a time. This mode advantageously minimizes the effective back EMF contribution, and maximizes the available run current.

In each embodiment of drive electronics 24, the first end of each of the various windings is coupled to a drive transistor. However, in some embodiments, the second ends of the various windings are coupled together to form a common node, whereas in another embodiment, the second ends are not coupled together, but instead are coupled to drive transistors in an "H"-bridge configuration.

Figure 4A:
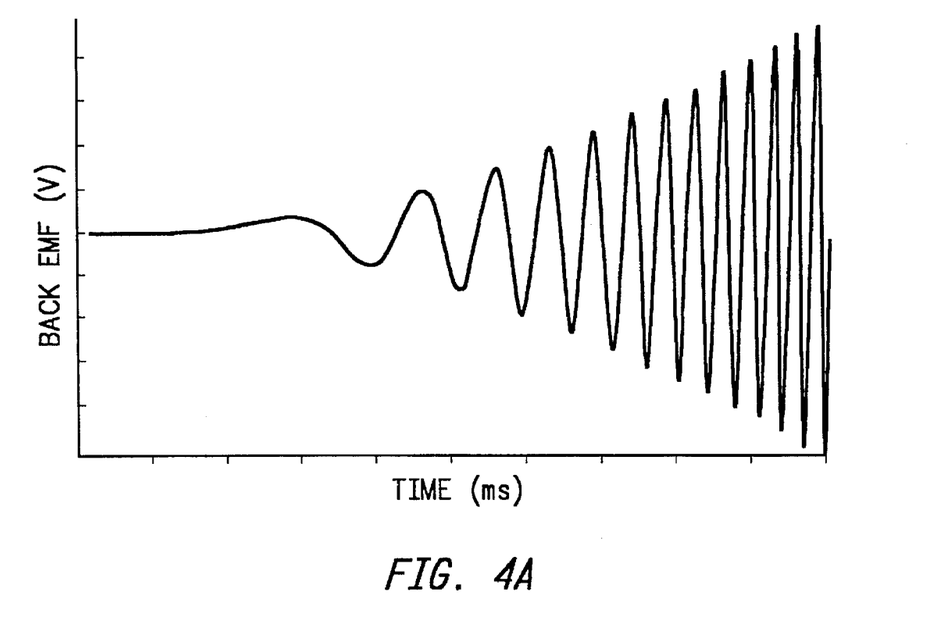
FIG. 4A depicts generated back EMF as a function of time for a single phase of a spindle motor.
Figure 4B:
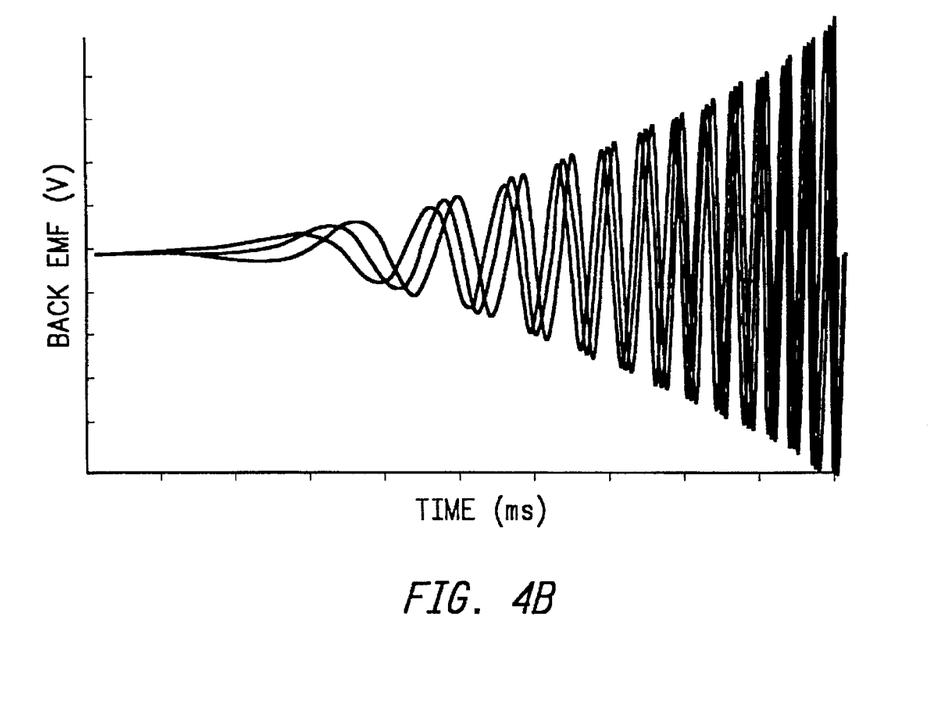
FIG. 4B depicts generated back EMF as a function of time for each phase of a three-phase spindle motor.

The operation of mode sense circuitry 22 will now be briefly described. As shown in FIGS. 4A and 4B, as the spindle motor powers-up, the generated back EMF begins at zero and increases in both peak-to-peak amplitude and in frequency as a function of time. Depending upon the spindle motor, the back EMF may increase to a few volts peak-to-peak within a second or two after start. Thus, mode sense circuitry 22 can sense back EMF magnitude (e.g., by peak-to-peak measurements) and/or sense frequency (e.g., by sensing zero crossings) to obtain a measure of $\omega$. A voltage or current proportional to the measured $\omega$ can then be compared to a predetermined reference voltage or current that is representative of the nominal $\omega_r$. If $\omega<\omega_r$, mode sense circuit 22 will output a signal to drive electronics 24 causing line-to-line configuration and operation of motor 8. On the other hand, when $\omega\geq\omega_r$, mode sense circuitry 22 will output a signal causing drive electronics 24 to configure and operate motor 8 in a line-to-neutral configuration.

Figure 5:
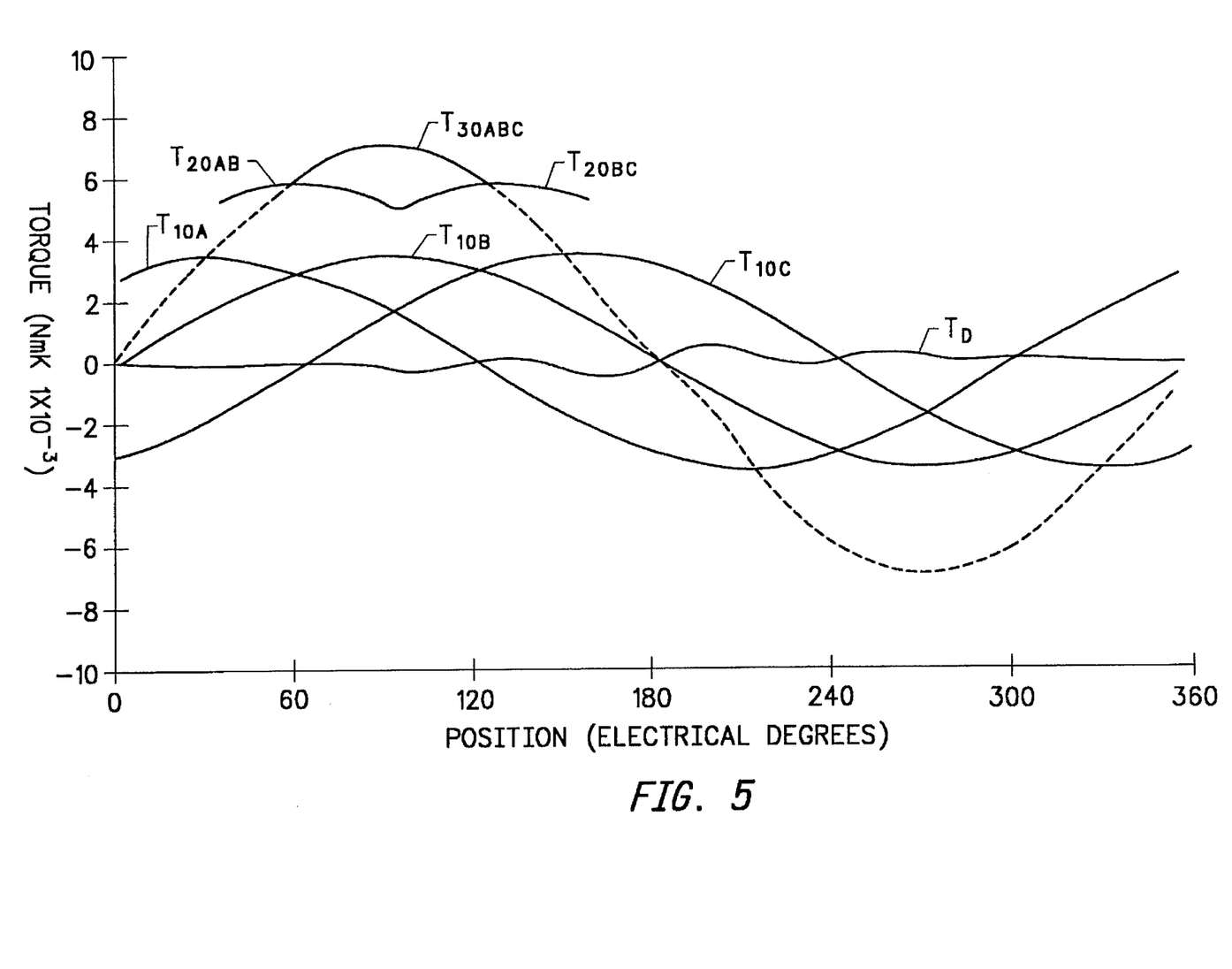
FIG. 5 depicts torque components produced from energizing single phases, two phases, and three phases, as well as detent torque.

FIG. 5 depicts torque for a three-phase spindle motor as a function of rotor position, as measured in electrical degrees. Shown spaced-apart 120° are relatively low magnitude torques for the individual phases, denoted Tl$\phi$A, Ti$\phi$B, and Ti$\phi$C. If two phases are series-coupled, the vector-summned resultant torque will be approximately $\sqrt{3}$ or 1.73 times higher than for a single phase. This is shown by the waveforms denoted T2$\phi$AB and T2$\phi$BC, which represent line-to-line energizing of phases A and B, and then phases B and C. If all three phases are series-coupled, the resultant torque, denoted T3$\phi$ABC is even higher, as shown.

It will be appreciated that a variety of circuits and components comprising drive electronics 24 may be used to dynamically configure motor 8, according to the present invention.

Figure 6:
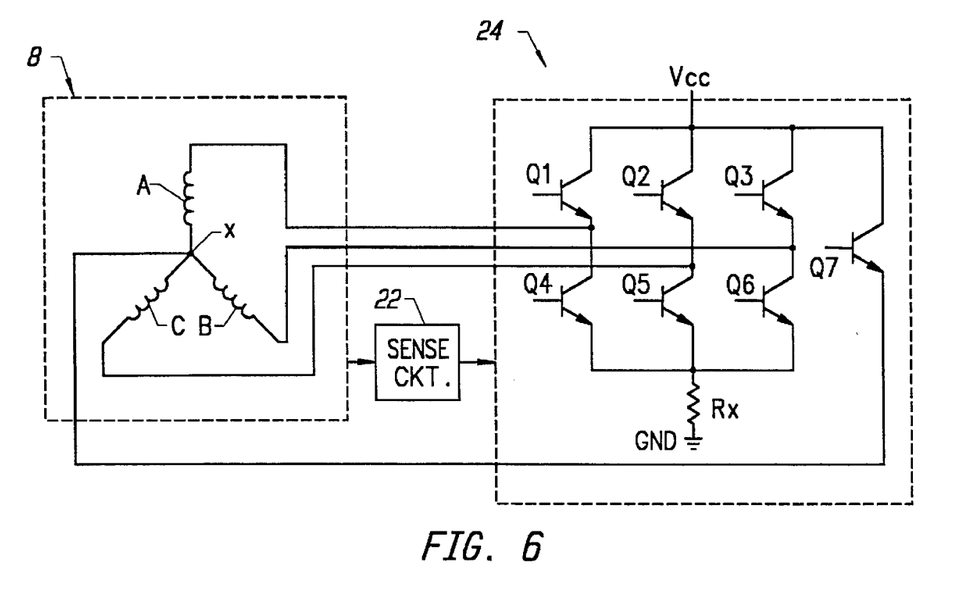
FIG. 6 depicts a seven-transistor drive electronics circuit for bi-mode operation of a three-phase spindle motor, according to the present invention.

FIG. 6 depicts a first embodiment of the present invention. Drive transistors Q1–Q6 are coupled to respect phase ends of windings A, B and C, wherein the other phase ends are coupled together to form a common node labelled "x". Node x is coupleable to the Vcc power source via mode switch Transistor Q7.

When Q7 is off, drive transistors Q1–Q7 can operate motor 8 in line-to-line mode, as in the prior art. It is understood that drive circuitry 24 includes low level circuitry coupled to the base leads of transistors Q1–Q7. The low level circuitry is also coupled to mode sense circuit 22, and outputs proper base drive signals to Q1–Q7. The best utilization of a motor is to employ as much of the motor at a time as possible, e.g., to employ all three phases in a three phase motor. If desired, more than two phases may be simultaneously operated in the line-to-line mode by generating appropriate base drive signals for Q1–Q7.

Once normal run speed has been ascertained (as confirmed by sense circuit 22), motor 8 is reconfigured to operate line-to-neutral. With reference to FIG. 6, the low level circuitry associated with circuit 24 now biases Q1, Q2 and Q3 off, and biases Q7 on, thus bringing node x close to Vcc potential. By sequentially turning on Q4, Q5, Q6, line-to-neutral or unipolar operation of motor 8 results, with only one line energized at a time. As noted, this advantageously reduces the magnitude of retarding back EMF, and thus permits a given magnitude Vcc to reliably sustain the motor rotation. It will be appreciated, however, that in line-to-neutral mode, the current density associated with drive transistors Q4, Q5 and Q6 will be relatively high, as these transistors will carry the motor current.

Figure 7:
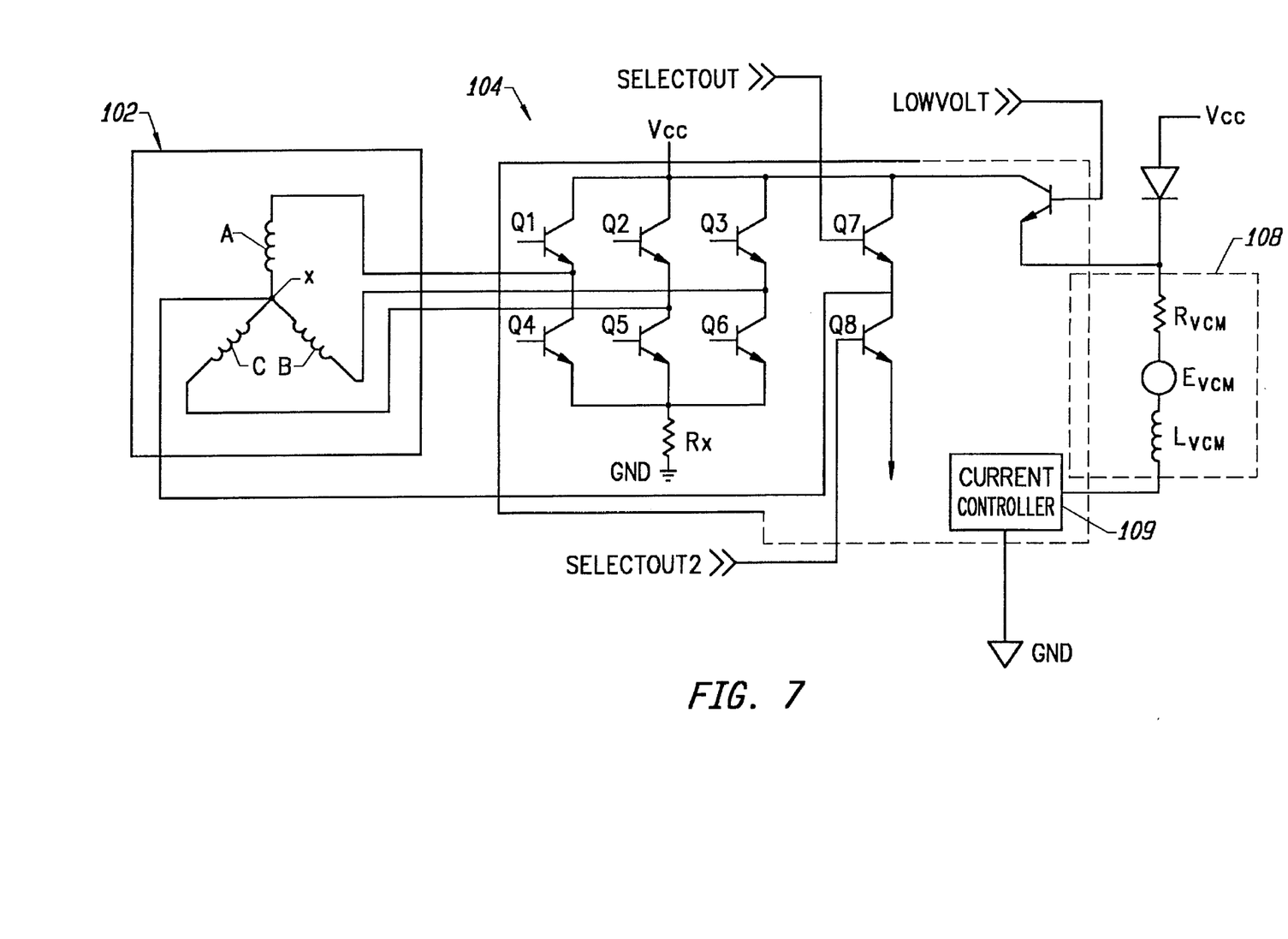
FIG. 7 depicts an eight-transistor drive electronics circuit for bi-mode operation of a three-phase spindle motor, according to the present invention.

FIG. 7 depicts yet another configuration for drive electronics 24, suitable for dynamically reconfiguring operation of motor 8. For start-up, motor 8 is operated line-to-line, and Q1–Q6 are switched in the normal fashion by low level circuitry associated with electronics 24, with additional transistors Q7 and Q8 biased off. However, when mode sense circuit 22 determines that normal run speed is present, drive electronics 24 now operates Q7–Q8 in the following manner: Q1–Q8 on to energize A, then Q6–Q7 on to energize B, then Q2–Q8 to energize C, then Q4–Q7 on to energize A, then Q3–Q8 on to energize B, then Q5–Q7 on to energize C, and so forth.

Using the configuration of FIG. 7, the advantages of line-to-line start, and line-to-neutral run are attained. Further, ripple associated with torque will be less, contrasted to the embodiment of FIG. 6, in that current may be switched twice as frequently, although 50% more power loss is encountered in single phase operation.

As described in U.S. patent application Ser. No. 08/204, 840 filed Mar. 1, 1994 by applicant John C. G. Dunfield entitled "Method and Apparatus For Transferring Power From a Spindle Motor to a Voice Coil" and assigned to the common assignee Seagate Corporation, the configuration of FIG. 7 may be used to assist the voice coil mechanism 18 (see FIG. 1). As described more fully therein, when powering-down motor 8, at it is necessary to park the head-end of actuator 12 on a ramp, or otherwise remove the head-end from the surfaces of discs 4 and 6. The circuit of FIG. 7 can assist by transferring energy from the spindle motor 8 to the voice coil mechanism 18 at this time. More specifically, at power-down, e.g., in response to an on-off switch controlling Vcc, drive electronics 24 can advantageously cause motor 8 to revert from line-to-neutral mode back to a line-to-line mode. The line-to-line back EMF generated in that mode will be 1.73 times larger than in line-to-neutral mode, which extra voltage can be energy-coupled to the voice coil mechanism to provide additional current to help park the heads 14, 16. Applicant refers to and incorporates herein by reference said co-pending U.S. patent application.

Figure 8:
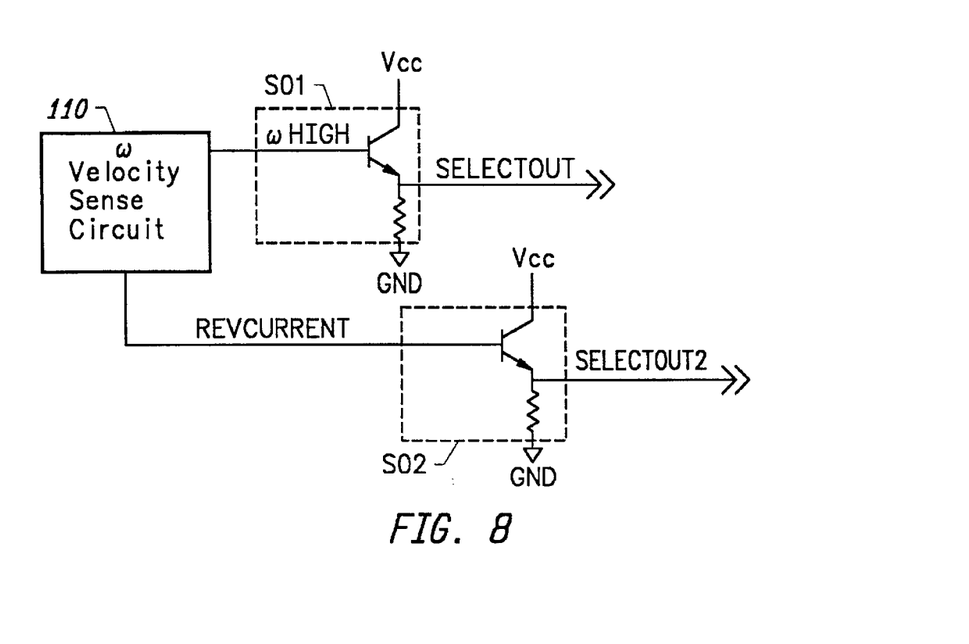
FIG. 8 depicts a twelve-transistor 3-"H" drive electronics circuit for multi-mode operation of a three-phase spindle motor, according to the present invention.

FIG. 8 shows yet another embodiment of the present invention, wherein six leads must be brought out from motor 8 for coupling to a drive electronics 24 that provides an "H"-bridge per winding. By "H"-bridge it is meant that each winding A, B, C is coupled as the horizontal element of an "H"-shaped bridge, whose vertical sides are a transistor pair. For example, transistors QA1 and QA4 form the left vertical side of an "H"-shaped bridge for winding A, for which transistors QA'1 and QA'5 form the right vertical side.

Also shown in FIG. 8 are optional bilateral switches, e.g., devices that can conduct current in either direction, coupled between the "H"-bridges. These switches, denoted Q-AB, Q-BC and Q-AC permit further dynamic configuration of the spindle motor to generate additional torque as needed.

Operation of the drive electronics 24 shown in FIG. 8 is preferably determined by mode sense circuit 22. For example, by turning off transistors QA'5, QB'6 and QC'6, line-to-line mode operation may be provided. However, if transistors QA'5, QB'6 and QC'6 are turned on, a common node such as node x in FIG. 7 is created, whereupon windings A, B and C may be operated line-to-neutral.

The "H"-bridge configuration of FIG. 8 permits using a higher percentage of the spindle motor (e.g., using more phases) to promote spindle motor efficiency. The torque curves shown in FIG. 5 demonstrate that by selectively energizing one, two or three phases simultaneously, generated torque can be varied as required.

The "H"-bridge configuration of FIG. 8 advantageously permits starting a spindle motor with one winding on (e.g, to consume maximum energy, for example in a battery operated system), with two windings on, or with three windings on.

Consider, for example, the use of the "H"-bridge configuration of FIG. 8 to start a spindle motor with two phases on, whereupon the motor operates about as if in a line-to-line configuration. For example, windings A and B may be so operated by turning on transistors QA1 and QA'5, and QB2 and QB'6. However, these windings may also be energized by turning on QA'1 and QA4, and by turning on QB'2 and QB6. This flexibility permits the energized windings to draw current from two portions of drive electronics 24, whose effective source impedance is approximately halved due to the parallel drive configuration that results. For a given Vcc, current through the energized windings may thus be increased, contrasted to a conventional line-to-line configuration.

Thus energizing two phases using the "H"-bridge configuration of FIG. 8, produces torques similar to those produced in a conventional line-to-line configuration, but more start current can be provided. It will be appreciated, for example, from Table I, that the start current can readily be ten times the run current for a spindle motor.

The drive electronics shown in FIG. 8 further allow flexibility in operating a spindle motor. For example, suppose upon power-up, motor 8 does not start, possibly due to increased rotor bearing friction due to ageing. The present invention permits starting the motor by energizing two windings, with resultant increased drive current and starting torque. If the motor starts (as sensed by sense electronics 22), then drive electronics 24 can be commanded to operate by energizing but a single winding at a time, commutating over 120° (electrical). This advantageously reduces current, an important consideration for battery operated hard disc drive units. Thus, while it may take longer to achieve full running velocity, if reduced power consumption is a more important consideration, the drive electronics shown in FIG. 8 can operate a spindle motor in the more efficient mode.

Further, should the spindle motor not start even with two windings on, the circuit of FIG. 8, by energizing various bilateral switches Q-AB, Q-BC, Q-AC can "jump start" the motor by energizing three phases, in an especially low drive impedance mode. If the motor is indeed viable, the resultant high torque achieved by combining three phases (see FIG. 5) will start the motor, whereupon the number of energized phases may be reduced from three to two, or even to one.

It will be appreciated that many configurations for drive electronics 24 may be implemented, using, without limitation, bipolar transistors and/or field effect transistors. Further, although the preferred embodiments have been described with respect to a three-phase motor, the present invention may be used to operate brushless DC motors having more than three phases. As a general proposition it may be desirable to start such motors by energizing as many series-coupled windings as possible (to ensure generation of a sufficiently large starting torque), preferably with a low source impedance (to maximize start current). After the motor is running, it is preferably reconfigured to operate in a mode wherein fewer windings (e.g., one) are energized (to ensure sufficient run current). However, as noted, it is also possible to run the motor with more than one phase energized at a time.

Figure 9:
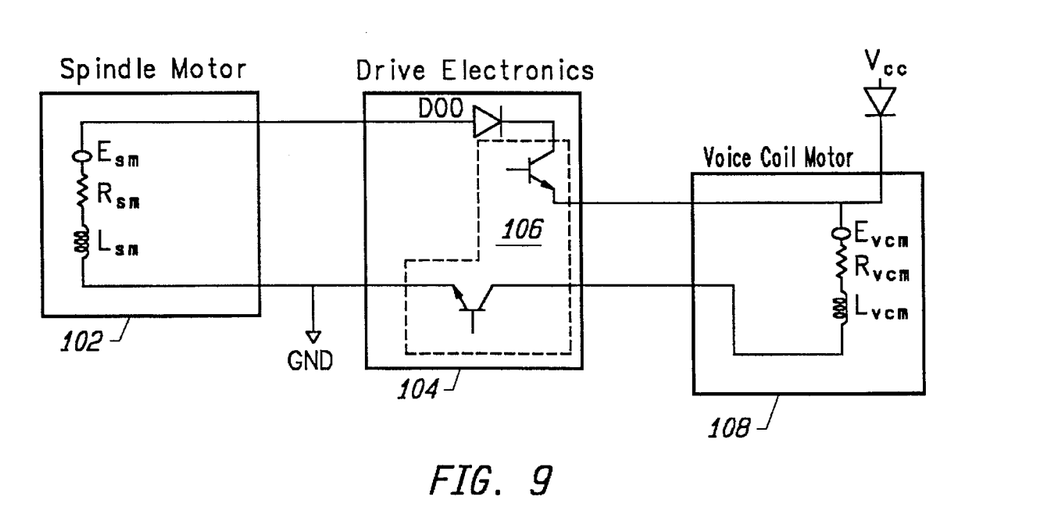
FIG. 9 is a block diagram of the present invention.
Figure 10:
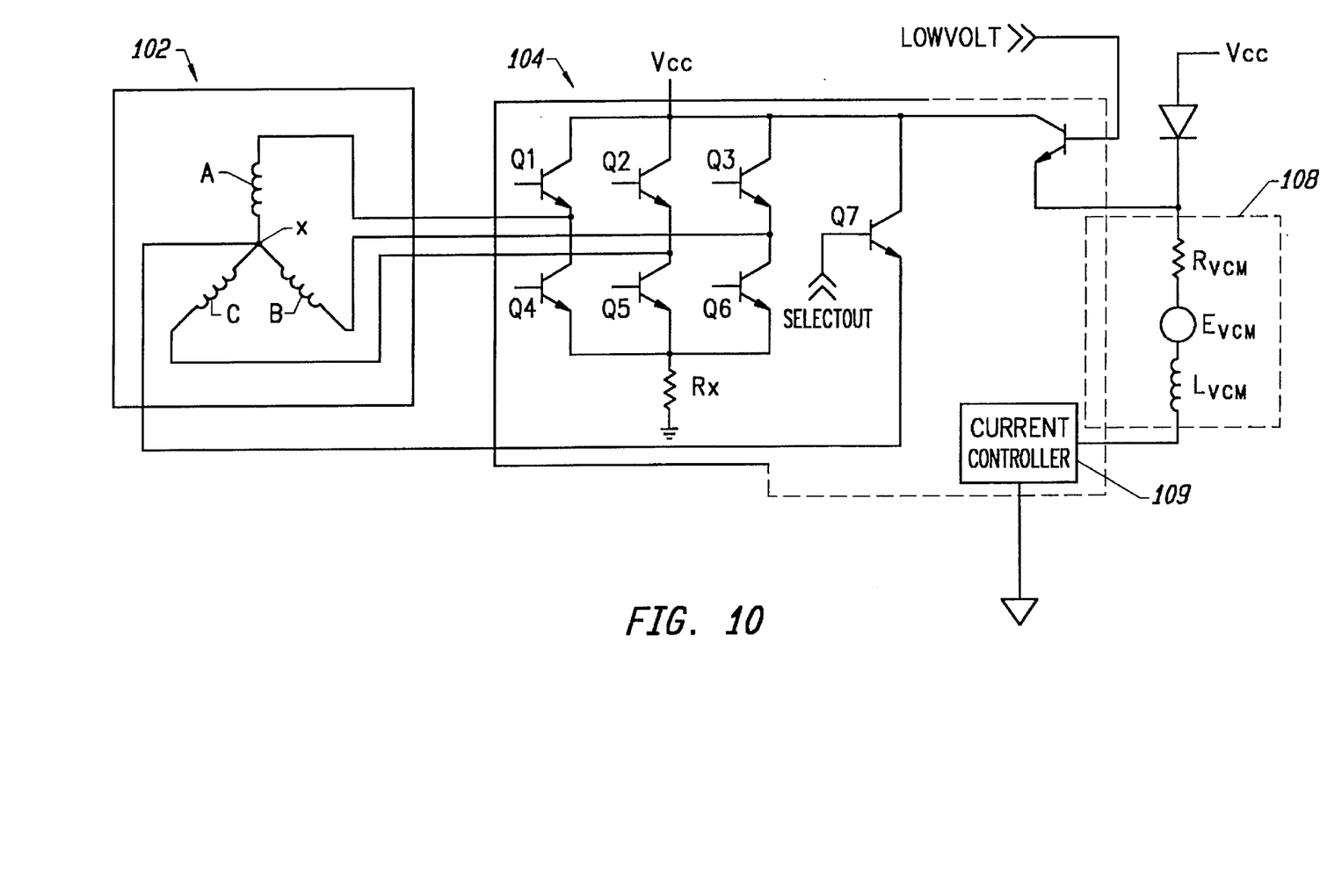
FIG. 10 is a schematic diagram of a seven transistor drive electronics circuit for bi-mode spindle motor operation, according to the preferred embodiment of the present invention.
Figure 11:
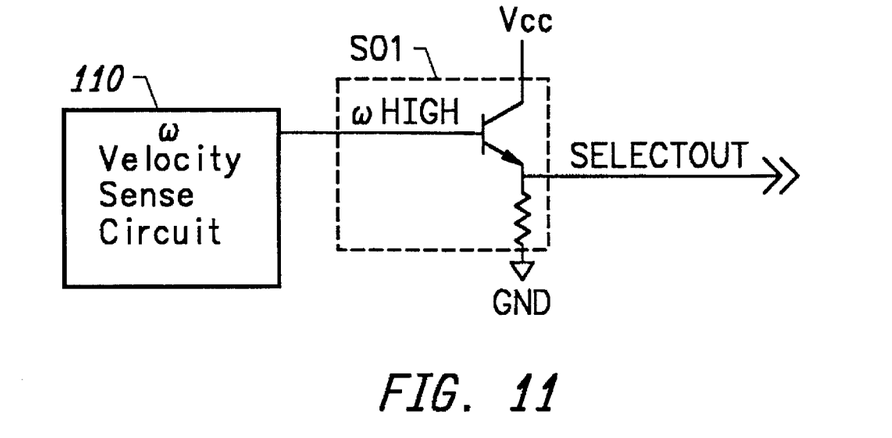
FIG. 11 is a schematic diagram of a $\omega$ (velocity) sense circuit and first selector, according to the preferred embodiment of the present invention.

Attention is next directed to FIG. 9 which comprises a simplified schematic diagram of a portion of a disc drive 100 having a spindle motor 102 connected to drive electronics 104. The spindle motor 102 may be operated as a generator upon power shutdown and is effectively represented as a series combination of a source voltage $E_{sm}$ coupled to a source impedance $R_{sm}$ and inductance $L_{sm}$. The series combination $E_{sm}$ and $R_{sm}$ is electrically connected to the drive electronics by means of a diode D00. The drive electronics 104 includes a switching circuit 106 for transferring current from the spindle motor 102 to the voice coil motor 108. The voice coil motor 108 is represented as a series combination of an opposing potential $E_{vcm}$ (which is effectively zero at power-down), an inductance $L_{vcm}$ and a load resistance $R_{vcm}$. Referring now to FIG. 10, a schematic diagram of an apparatus for transferring current from a spindle motor 102 to a voice coil motor 108 is shown. The spindle motor includes internal motor windings A, B, C for a common three-phase spindle motor 102. Drive electronics 104 are utilized to regulate the power from a source power supply $V_{cc}$ to each of the windings A, B, C. As shown, the drive electronics 104 dedicate two transistors for the control of each winding so as to provide for current flow in each winding in both directions, six transistors Q1–Q6 in total as described above. Referring now to FIG. 11, the microprocessor controller circuitry for controlling transistor Q7 may be effectively represented as a combination of a ω (velocity) or more generally mode sensing circuit 110 and selector S01. The output of selector S01 drives the base of transistor Q7, whose first input is provided by a ω (velocity) sensing circuit 110. The ω (velocity) sensing circuit 110 provides a positive drive signal ωHIGH upon achieving the desired motor velocity, at which time the ω HIGH line is held high. Accordingly, the SELECTOUT signal line will be held high, switching on transistor Q7. The motor operation may now be conducted in uni-polar mode wherein only a single winding is powered at any one time. Motor operation is accomplished by manipulating transistors Q4, Q5 and Q6 by the microprocessor controller with transistors Q1, Q2 and Q3 no longer active. The emitter output of transistor Q9 is coupled to the voice coil motor 108, shown schematically at equivalent resistance $R_{vcm}$. The return from the voice coil motor 108 (shown schematically as the lower terminal of $L_{vcm}$) is connected to the current controller 109 for the voice coil motor 108, whose output is in turn coupled to the source power supply ground GND. The base input of transistor Q9 is coupled to the output of a voltage sensing circuit 112 via the LOWVOLT signal line. Those ordinarily skilled in the art will recognize that any active devices may be used for Q9 including but not limited to FETs, BIFETs or any other active device.

Figure 12:
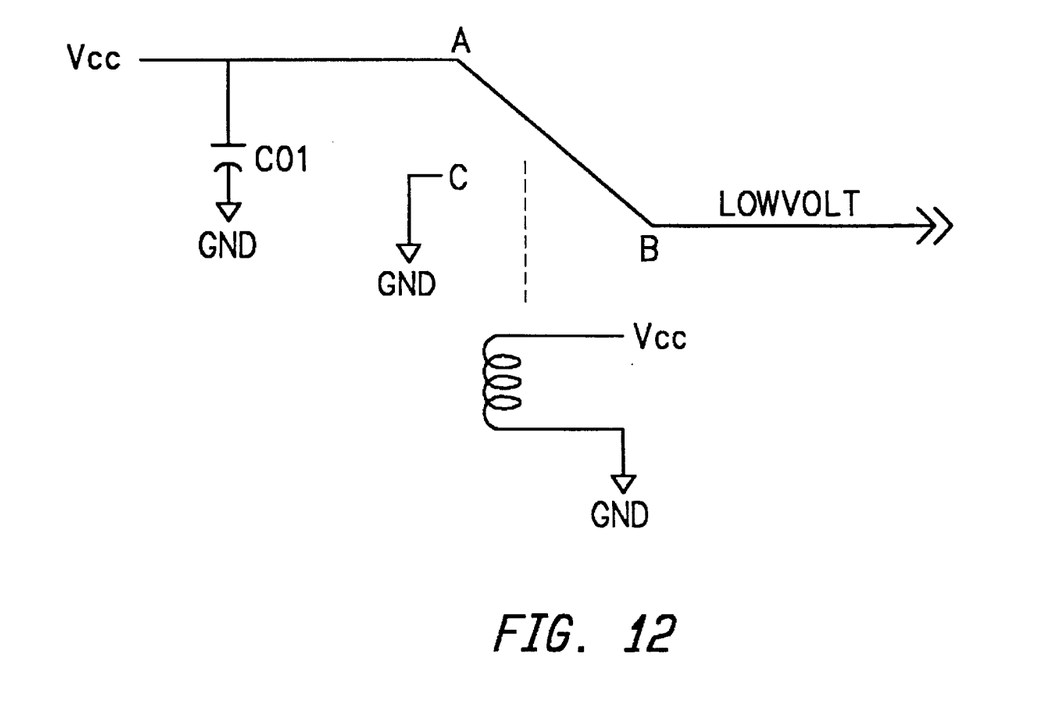
FIG. 12 is a schematic diagram of a voltage sense circuit, according to the preferred embodiment of the present invention.

The mode sensing circuit 110 may be any of a type commonly known in the art. The circuit 110 is required to sense a power-down or a low voltage condition, or some other representative parameter. In this embodiment a voltage sense circuit 112 is utilized. A low voltage condition would be defined as one wherein the source voltage $V_{cc}$ is such that coupled with an opposing back EMF from the uni-polar operation and system losses, insufficient current would be developed to operate the motor (per $I=(V_{cc}-E_x)/Z_x$, and $T=I \times K_t$, from above). One type of voltage sense circuit is shown in FIG. 12 wherein the voltage sense circuit 112 includes relay XK1 and capacitor C01. The voltage sensing circuit 112 receives the source voltage $V_{cc}$ input and couples it to the cathode of capacitor C01, to the positive side of the energizing coil of relay XK1, and to the relaxed state contact A of relay XK1. The source power supply GND input is coupled to the energized contact C and to the negative side of the energizing coil of relay XK1. The common contact B of relay XK1 forms the output of the voltage sense circuit 112 generating the appropriate signal onto the LOWVOLT signal line. Upon a power-down or low voltage condition, the voltage sense circuit 112 outputs a positive output signal on the LOWVOLT line, thereby turning on transistor Q9.

At motor start-up, the spindle motor is operated in a line-to-line configuration in which two phases of the motor windings are powered at a time via transistors Q1–Q6 as described above. The SELECTOUT signal line will be held low until sufficient speed has been built up in the motor as defined by the ωHIGH output of the ω (velocity) sense circuit, thereby maintaining transistor Q7 in the off state at power-up. Those ordinarily skilled in the art will recognize that selector S01 will latch the ωHIGH signal line to the selector output, and thus SELECTOUT signal line, as long as the source power supply $V_{cc}$ is sufficient. Similarly, the LOWVOLT signal line will also be held low at start-up, thereby maintaining transistor Q9 in the off state.

After the motor has reached operating speed, transistor Q7 is turned on and transistors Q1–Q3 are disabled, thereby operating the motor in a second mode, line-to-neutral. This is accomplished by outputting a positive voltage signal from the ω (velocity) sense circuit on the wHIGH signal line, which in turn is coupled via the selector S01 to the base input of transistor Q7 on the SELECTOUT signal line. The motor is now operated in a uni-polar fashion by the commutation of transistors Q4–Q6 in a line-to-neutral mode.

Upon a low voltage or power-down condition, a positive high signal output from the voltage sense circuit 112 is output on the LOWVOLT signal line thereby turning on transistor Q9. For the voltage sensing circuit disclosed, as the source power supply $V_{cc}$ voltage level begins to drop, the energizing coil of relay XK1 will switch the common contact B to the relaxed state, whereby the relaxed contact A will be coupled to the common contact B of the relay XK1. The previously charged capacitor C01 will begin to discharge, thereby resulting in a positive output on the LOWVOLT signal line. Accordingly, transistors Q9 and Q10 will conduct, effectively coupling the spindle motor 102 across the voice coil motor 108. Simultaneously, the ωHIGH signal line to selector S01 will be disabled thereby holding the SELECTOUT signal line low, disabling transistor Q7. Accordingly, with the Q7 transistor turned off, the motor will return to the line-to-line mode.

Those ordinarily skilled in the art will recognize that the back EMF developed across a pair of windings will be available for delivering current to the voice coil motor 108, thereby resulting in a resultant voltage $E_{sm}$ which is the square root of three times higher than that of a single back EMF (assuming a sinusoidal back EMF) in any winding A, B, C. When this condition is sensed, the drive is reconfigured to operate the spindle motor back to a line-to-line mode, wherein the highest power pair of motor windings are electrically held across the source power supply $V_{cc}$ lines. The present invention will act as a self commutator continuously cycling the highest power pair of windings to act as the source for the voice coil motor 108. Those ordinarily skilled in the art will recognize that the capacitance in the voice coil motor $V_{cc}$ power supply will result in discharge upon power-down, delivering current for a small time t after the supply has shut-down. Accordingly, the self commutation will include utilizing the voice coil source power supply $V_{cc}$ in assisting delivering power to the voice coil motor. Those ordinarily skilled in the art will also recognize that discrete components including transistors and their progeny may be substituted for the relays disclosed without departing from the spirit of the present invention.

Figure 13:
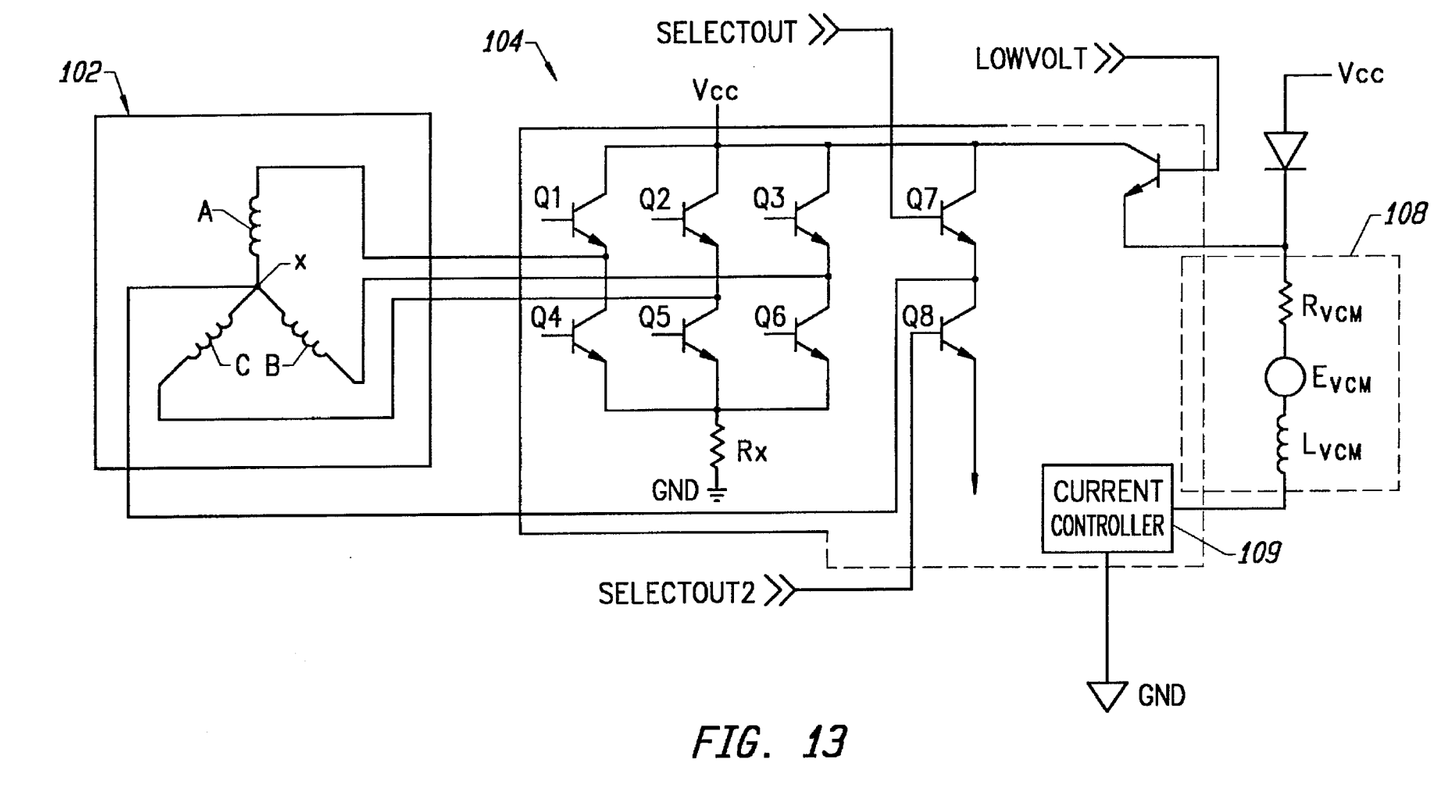
FIG. 13 is a schematic diagram of an eight transistor drive electronics circuit for bi-mode spindle motor operations, according to the preferred embodiment of the present invention.

Referring now to FIG. 13, an alternative embodiment of the present invention is disclosed using like numerals and symbols to describe like elements. Drive electronics 104 further includes an eighth transistor Q8 for use during operation in the line-to-neutral mode. The collector input to transistor Q8 is coupled to the emitter output of transistor Q7 as well as to the neutral point common between the windings A, B, C of the spindle motor 102. The emitter output of transistor Q8 is coupled to ground GND. By manipulating the base inputs to transistors Q7 and Q8, the motor may be operated in a uni-polar mode with current able to flow in either direction in any winding A, B, C of the spindle motor 102. For example, upon arriving at the operating speed, transistor Q7 could be turned on wherein the source power supply $V_{cc}$ is effectively tied to the neutral point between the windings A, B, C. Thereafter transistors Q4–Q6 may be cycled on or off so as to provide current flow across the windings A, B, C via the neutral point in a first direction. Alternatively, transistor Q8 may be turned on, and Q7 turned off, effectively placing the neutral point between the motor windings A, B, C at ground (GND). In this way, transistors Q1–Q3 may now be cycled so as to provide current flow via the neutral point in an opposite direction. The base input to transistors Q1–Q8 is controlled by the microprocessor controller (not shown) of the drive electronics 104.

The base input to transistor Q8 is coupled to a microprocessor controller (not shown) within the drive electronics 104, which generates sequential base drive signals for the control of transistor Q8. Those ordinarily skilled in the art will recognize that any active devices may be used for Q8 including but not limited to FETs, BIFETs or any other active device.

Figure 14:
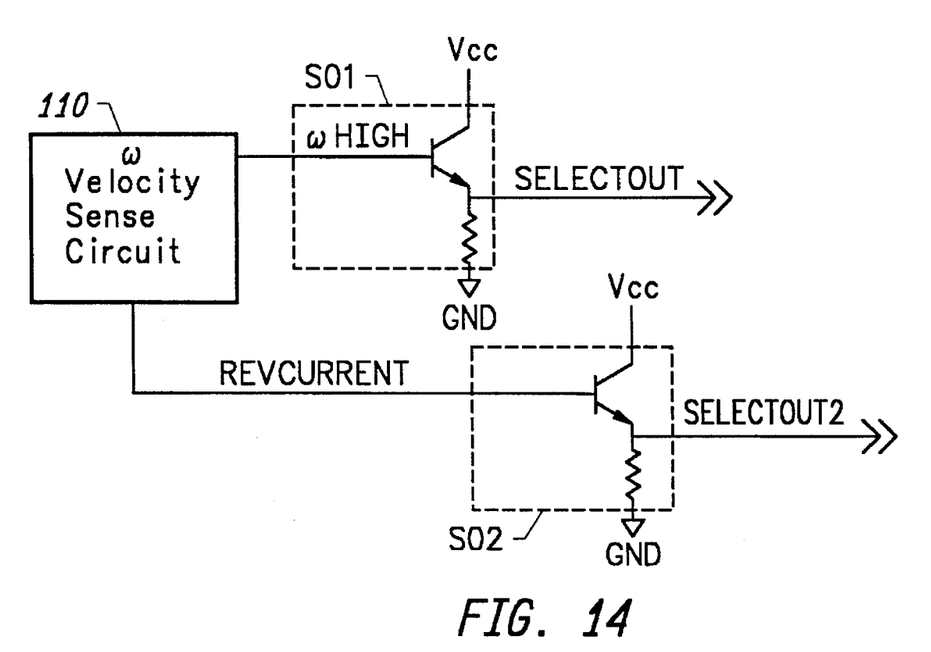
FIG. 14 is a schematic diagram of an alternative sense circuit and first and second selectors, according to the preferred embodiment of the present invention.

Referring now to FIG. 14, the microprocessor controller circuitry or mode control circuitry for controlling transistor Q7 and Q8 may be effectively represented as a combination of a ω (velocity) sensing circuit 110 and pair of selectors S01 and S02. Other representative parameters may also be monitored. The output of selector S01 drives the base of transistor Q7, whose first input is provided by a ω (velocity) sensing circuit 110. The ω (velocity) sensing circuit 110 provides a positive drive signal ωHIGH upon achieving the desired motor velocity, at which time the ωHIGH line is held high. Accordingly, the SELECTOUT signal line will be held high, switching on transistor Q7. The ω (velocity) sense circuit 110 provides a second output on the RECURRENT line which is tied to the input of selector S02. The ω (velocity) sense circuit 110 will generate either one of two positive signal outputs, thereby enabling either the ωHIGH signal line or the RECURRENT signal line depending on which transistor Q7 or Q8 is desired to be active. Neither signal line will be held high until the motor has reached its operating speed. Upon reaching operating speed, ω (velocity) sense circuit 110 will alternatively activate transistor Q7 and Q8, thereby allowing for current flow in either direction in a given winding $L_a$, $L_b$, $L_c$ of the spindle motor 102. The motor operation may now be conducted in uni-polar mode wherein only a single winding is powered at any one time. If the ωHIGH signal line is active, transistor Q7 will be turned on and motor operation is accomplished by manipulating transistors Q4, Q5 and Q6 by the microprocessor controller with transistors Q1, Q2 and Q3 no longer active. If the RECURRENT signal line is active, transistor Q8 will be turned on and motor operation is accomplished by manipulating transistors Q1, Q2 and Q3 by the microprocessor controller with transistors Q4, Q5 and Q6 no longer active.

Upon a low voltage or power-down condition, a positive high signal output from the voltage sense circuit 112 is output on the LOWVOLT signal line thereby turning on transistor Q9. As described above transistor Q9 will conduct effectively coupling the spindle motor 102 across the voice coil motor 108.

Simultaneously, the ωHIGH signal line to selector S01 and the RECURRENT signal line to selector S02 will be disabled thereby holding the SELECTOUT and SELECTOUT2 signal lines low, disabling transistor Q7 and Q8. Accordingly, with the Q7 and Q8 transistor s turned off, the motor will return to the line-to-line mode. This will result in a series combination of pairs of windings for powering the voice coil motor. Accordingly, the back EMF developed across a pair of windings will be available for delivering current to the voice coil motor 108, thereby resulting in a resultant voltage $E_{sm}$ which is the square root of three times higher than that of a single back EMF in any winding A, B, C. Discrete components including transistors and their progeny may be substituted for the relays and switches disclosed without departing from the spirit of the present invention.

What is claimed:

1. A method for dynamic operation of a brushless N-phase DC motor, where N>3, wherein a first end of each phase is coupled to a source of operating voltage or ground by an associated drive switch, and each second end of each said phase is coupled via a mode switch to said source of operating voltage, comprising the following steps:

(a) when said motor has a rotational speed less than a predetermined run velocity, configuring said motor in line-to-line mode by series-coupling at least two of said N-phases to a source of operating voltage;

(b) when said motor has a rotational speed at least equal to said predetermined run velocity, configuring said motor in line-to-neutral mode by coupling fewer than two of said N-phases to said source of operating voltage configuring said motor between step (a) and step (b) by selectively changing the state of said mode switch and at least a chosen one of said drive switches;

(c) upon sensing a power-down or low voltage condition in said source voltage, reconfiguring drive electronics to said line-to-line operation; and (d) connecting one of said series, pairs of windings and associated resultant back EMF to said motor, thereby delivering current from said spindle motor to said voice coil motor.

2. The method of claim 1, wherein N=3, and wherein at step (a) two of said phases are series-coupled to said source of operating voltage, and wherein at step (b), one of said phases is coupled to said source of operating voltage.

3. The method of claim 1, wherein said rotational speed of said motor is determined by examination of back electromagnetic force generated by said motor.

4. The method of claim 1 further comprising the step of:
   moving an actuator carriage of said magnetic disc drive by means of said voice coil motor to a parking region upon power down or low voltage in said source power supply.

5. The method of claim 1 wherein the step of connecting a pair of said plurality of series pairs of windings further comprises the step of:
   connecting a highest voltage pair of said plurality of series pairs of windings and associated resultant back EMF to said voice coil motor.

6. The method of claim 1 wherein the step of connecting a pair of said plurality of series pairs of windings further comprises the step of:
   commutating said plurality of series pairs of windings so as to always provide the highest voltage pair of said plurality of series pairs of windings as a source of current to said voice coil motor.

7. The method of claim 6 wherein the step of moving an actuator carriage of said magnetic disc drive further includes the step of:
   parking a transducer attached to an actuator carriage of said magnetic disc drive on a ramp by means of said voice coil motor, whereby said transducer moves up said ramp upon power down or low voltage in said source power supply.

8. A system for dynamic operation of a brushless N-phase DC motor, where N>3, one end of each said phase is coupled between a source of operating voltage and an associated drive switch comprising:
   electronic switch drive means, coupled to said motor, for configuring said motor in line-to-line mode by series-coupling at least two of said N-phases to said source of operating voltage when rotational speed of said motor is less than a predetermined run velocity and for configuring said motor in line-to-neutral mode by series coupling fewer than two of said N-phases to said source of operating voltage when said rotational speed is at least equal to said predetermined run velocity wherein configuration of said motor between said line-to-line mode and said line-to-neutral mode is accomplished by selectively energizing at least a chosen one of said drive switches.

9. The system of claim 8 wherein N=3, and wherein said electronic switch drive means series-couples two of said phases to said source of operating voltage when said rotational speed is less than said predetermined run velocity and couples one of said phases to said source of operating voltage when said rotational speed is at least equal to said predetermined run velocity.

10. The system of claim 8, further including means for determining said rotational speed and for comparing said rotation speed to said predetermined run velocity.

11. The system of claim 10 wherein said means for determining examines back electromagnetic force generated by said motor.

* * * * *